J. BOYER.
Running-Gear.
No. 16,523. Patented Feb. 3, 1857.
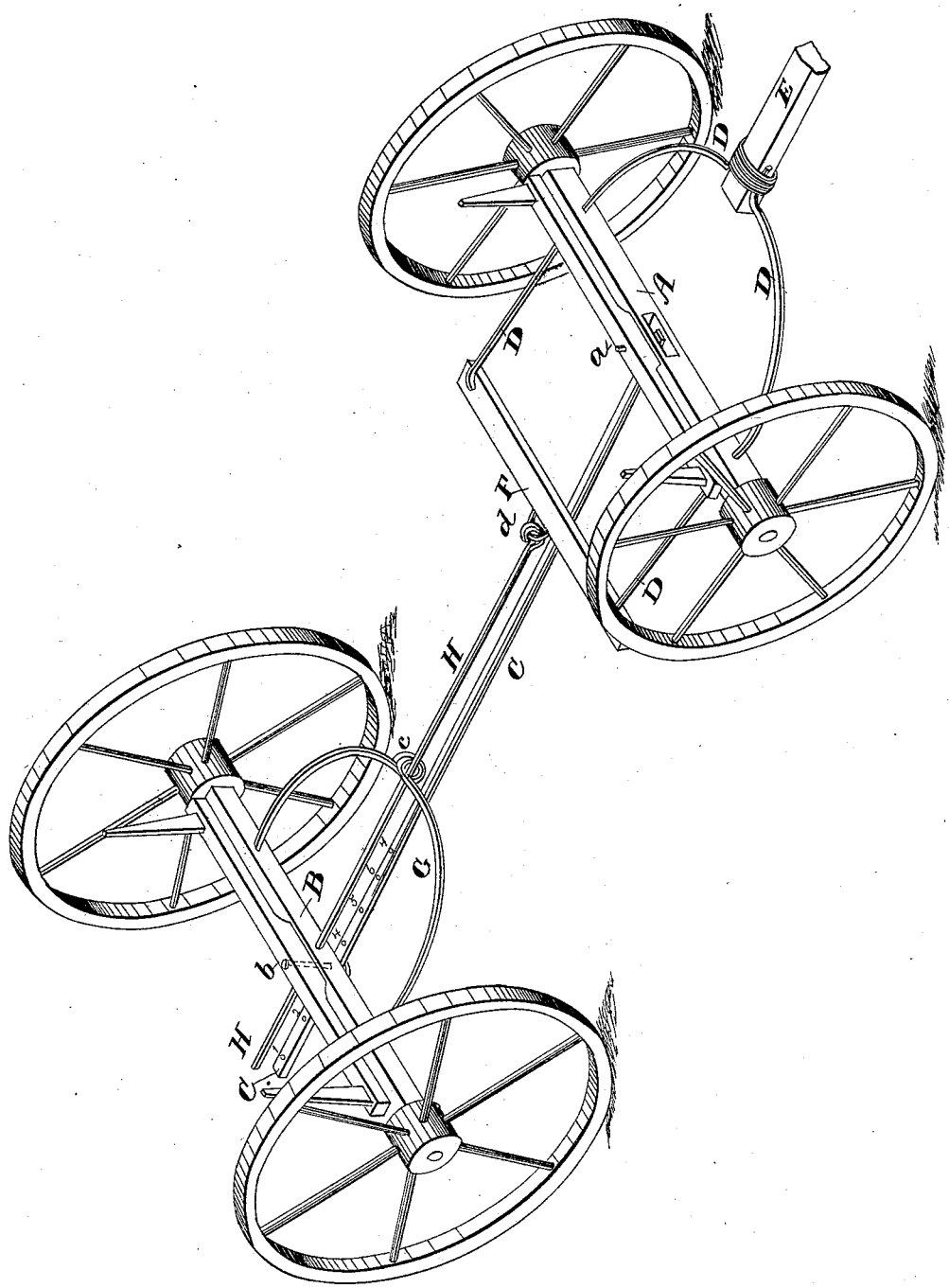

UNITED STATES PATENT OFFICE.

JACOB BOYERS, OF GRANDVILLE, VIRGINIA.

COUPLING FOR WAGONS.

Specification of Letters Patent No. 16,523, dated February 3, 1857.

*To all whom it may concern:*

Be it known that I, JACOB BOYERS, of Grandville, in the county of Monongalia and State of Virginia, have invented certain new and useful Improvements in Wagon-Couplings; and I do hereby declare the following to be a full, clear, and exact description of the same, reference being had to the accompanying drawings, making a part thereof, and which represent in perspective the running-gear of a wagon-carriage with the improvement attached.

The nature of my invention relates to the coupling of the hind and fore wheels of a wagon or carriage, so that the turning of the fore wheels shall turn the hind wheels so as to "track" as it is termend, when the devices used for this purpose will admit, of bringing the hind and fore wheels nearer to, or removing them farther from, each other as may be required, without in any manner effecting this "tracking" operation.

To enable others skilled in the art to make and use my invention I will proceed to describe the same with reference to the drawings, first stating that, I am fully aware, a great number of devices have been essayed for causing the hind wheels of a carriage or wagon to follow or track after the fore wheels. But in all these the hind and fore wheels had to maintain a uniform distance from each other, or in other words the carriage could not be coupled short or long, as the variety of work to which a wagon is applied might require; and for this reason these couplings have been used in carriages arranged for permanent bodies alone, and which did not require lengthening or shortening. I apply this form of coupling to even the common wagon for hauling timber, hay, long bars of iron, or any other similar purpose, where the wagon is coupled shorter or longer for each variety of work that it may be applied to, as I will now explain.

A, represents the front, and B, the rear axle of an ordinary wagon, each mounted in wheels in the common manner. These axles A, B, are coupled together by the usual coupling pole C, having any number of adjusting holes 1, 2, 3, 4, in it, and of such length as will make the wagon adaptable to any kind of hauling. The usual king bolts *a*, *b*, pass through the axles and the coupling pole.

D, D, are the front hounds, to which the tongue E, is connected. These hounds pass through the front axle A, and extend rearward some distance their extreme ends being connected together by a stiff bar F. A bow of iron G, projects forward of, and is securely fastened to, the rear axle B, and a dead-eye or loop *c*, is formed centrally of said bow. Or this bow may be a pair of hounds, and serve the same purpose.

To the center of the bar F, is connected by a dead eye *d* one end of a rod, bar, or pole H, which first passing through the dead eye *c* in the bow or hounds G, then passes through the rear axle B, in a hole made through it, in which it may freely move. The rod, bar, or pole H, serves as a lever for turning the hind axle, every time the front axle is turned by the tongue, and thus sets the hind wheels for following in the circle of the front ones. As the rod H, is in no wise permanently connected to the rear axle, it freely plays through its dead eye *c*, and the hole in the rear axle, and acts as a rudder to guide the rear axle and its wheels in the track of the front wheels.

The rod or pole H, may be of the same length of the coupling pole C, and the wagon may be shortened or lengthened at pleasure, and still the pole H, acts to guide the hind wheels. It is obvious that instead of the coupling pole C, the fore and hind axles may be coupled by the wagon bed, the king bolts passing through said bed. Or in hauling long timber, the timber itself may be used for coupling the hind and fore axle.

Having thus fully described the nature of my invention, what I claim therein as new and desire to secure by Letters Patent, is—

In combination with the ordinary coupling pole C, of a wagon, the rod, bar, or pole H, connected to the front axle, and passing through the bow or hounds G, and through the rear axle, for the purpose of causing the rear wheels to track after the front ones, and so that the two axles can be coupled shorter or longer, without in any way affecting the proper tracking of the wheels, as set forth.

JACOB BOYERS.

Witnesses:
ISAAC SCOTT,
D. C. PICKENPAUGH.